United States Patent Office
3,535,190
Patented Oct. 20, 1970

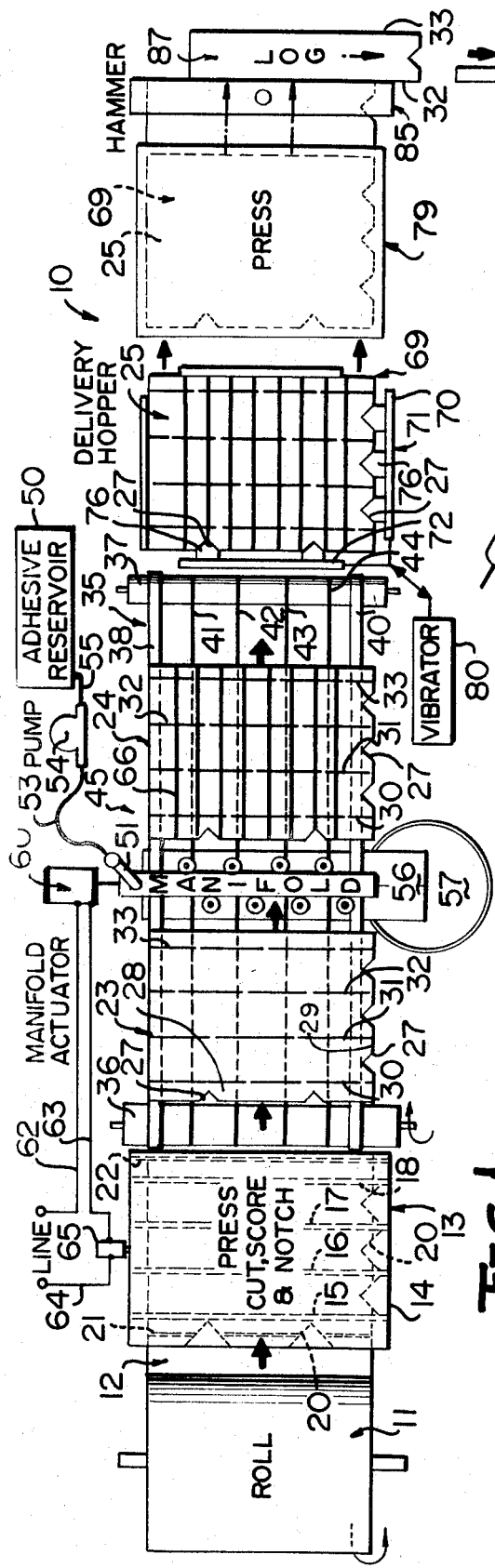
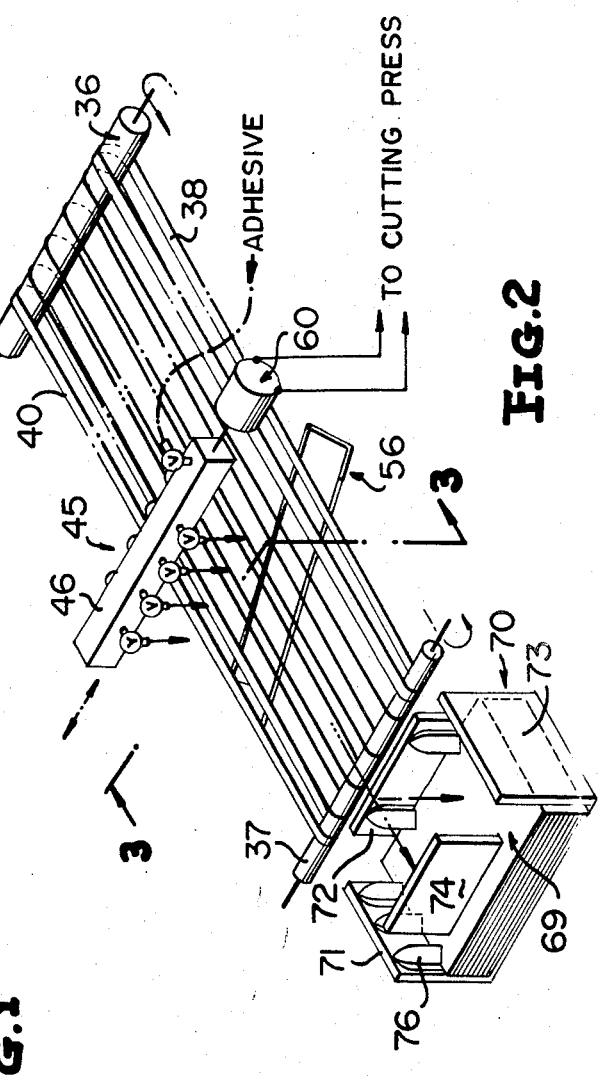
INVENTORS
JOSEPH T. LOOMER
& JAMES H. WING
ATTORNEYS

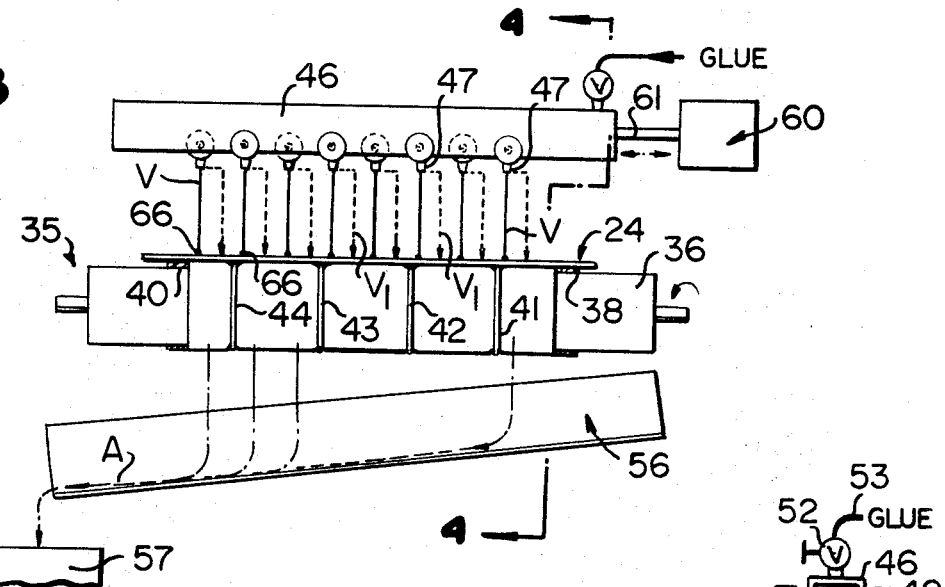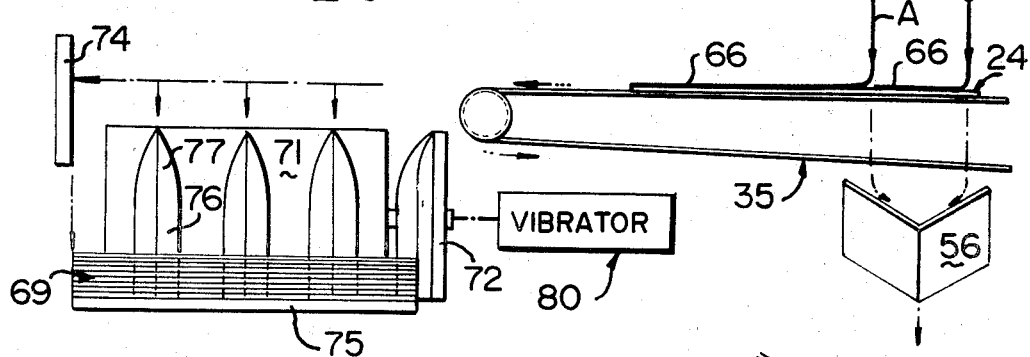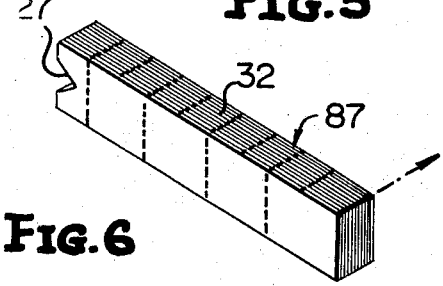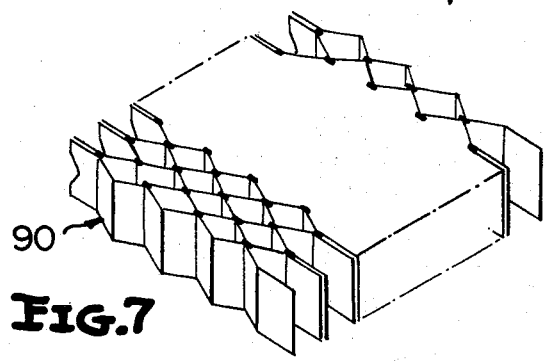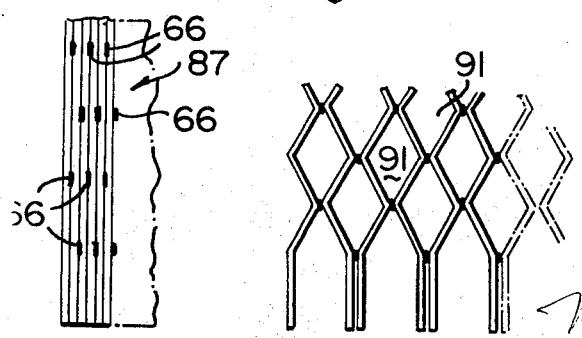

3,535,190
APPARATUS FOR MAKING HONEYCOMB STRUCTURES
Joseph T. Loomer, North Augusta, S.C., and James H. Wing, Augusta, Ga., assignors to Continental Can Company, Inc., New York, N.Y., a corporation of New York
Filed May 20, 1966, Ser. No. 551,665
Int. Cl. B32b 31/04
U.S. Cl. 156—548                                      7 Claims

ABSTRACT OF THE DISCLOSURE

This disclosure relates to apparatus for and a method of forming honeycomb structures by feeding sheet material along a predetermined path, forming spaced weakening lines in the sheet material generally transversely of the path, applying adhesive to the sheet material along lines disposed generally transverse to the weakening lines and parallel to the predetermined path, assemblying the sheet material in stacked relationship with the immediately adjacent superimposed and subimposed weakening lines being disposed in a common plane, and separating the sheet material along each common plane.

---

Honeycomb structures are conventionally produced by assembling a plurality of flexible sheets, such as paper, metal, plastic, etc., into a stack, and maintaining the sheets in assembled relationship by spaced, generally parallel lines of adhesive. Such structures are generally referred to as "honeycomb blocks" and are generally transformed into "honeycomb logs" by cutting the honeycomb block normal to the lines of adhesive. Each honeycomb block is then expanded and in the expanded form thereof is composed of a plurality of open-ended cells which are of any desired size and shape depending primarily upon the particular manner adhesive is applied to the individual sheets or blanks.

Several disadvantages are common in such conventional honeycomb structure fabricating procedures, chief among which is the inability to apply the adhesive to the sheets without depositing the adhesive upon associated equipment, the difficulty of stacking the sheets in exact alignment, and the inability to quickly and consistently cut the honeycomb blocks into honeycomb logs of uniform dimensions.

In keeping with the above it is a primary object of this invention to overcome the above and numerous other disadvantages in conventional honeycomb structure processes and apparatus by providing novel adhesive applying means which prevent adhesive from being deposited upon associated machinery, means for assuring accurate aligned stacking of the individual sheets, and means for separating each honeycomb block into consistently uniform honeycomb logs.

A further object of this invention is to provide a novel apparatus for forming honeycomb structures which includes means for conveying a plurality of sheet material blanks along a predetermined path in spaced relationship to each other, means for forming spaced weakening lines in the blanks, means for applying adhesive to the sheet material along lines disposed generally angularly to the weakening lines, means for assembling the blanks in registered stacked aligned relationship with each other, and means for separating the sheet material along planes taken through immediately adjacent superimposed and subimposed weakening lines of the blanks.

Still another object of this invention is to provide a novel apparatus of the type immediately heretofore described including means for forming registration notches in the blanks prior to the assembling thereof into stacked relationship and guide means cooperative with the registration notches for guiding individual ones of the blanks into stacked relationship.

A further object of this invention is to provide a novel apparatus of the type described including means mounting the adhesive applying means for movement above and transversely of the predetermined path, the conveying means including a plurality of conveying elements in spaced relationship beneath the adhesive applying means, and the adhesive applying means being operative to prevent any one line of adhesive from contacting any conveying element during the time leading and trailing ones of the blanks are respectively downstream and upstream of the adhesive applying means.

A further obpect of this invention is to provide a novel method of forming honeycomb structures by forming spaced weakening lines in sheet material, applying adhesive to the sheet material along lines disposed generally angularly to the weakening lines, assembling the sheet material in stacked relationship with immediately adjacent superimposed and subimposed weakening lines being disposed in a common plane, and separating the sheet material along each common plane.

A further object of this invention is to provide a novel honeycomb structure including a plurality of stacked sheet material blanks, lines of adhesive joining the blanks to each other, the lines of adhesive being positioned between the blanks in alternating staggered parallel relationship, a plurality of weakening lines in each of the blanks, the weakening lines being positioned transversely of the lines of adhesive, and immediately adjacent superimposed and subimposed weakening lines being disposed in a common plane.

With the above, and other objects in view that will hereinafter appear, the nature of the invention will be more clearly understood by reference to the following detailed description, the appended claims and the several views illustrated in the accompanying drawings:

In the drawings:

FIG. 1 is a schematic top plan view of a novel apparatus constructed in accordance with this invention, and illustrates the successive steps of transferring a continuous web of sheet material into individual honeycomb logs.

FIG. 2 is a highly schematic top perspective view of a downstream portion of the apparatus of FIG. 1 and illustrates adhesive applying means positioned above and movable transversely to a path of travel defined by a plurality of individual conveying elements.

FIG. 3 is a slightly enlarged schematic sectional view taken generally along line 3—3 of FIG. 2, and illustrates a plurality of nozzles of the adhesive applying means depositing lines of adhesive upon a sheet material blank.

FIG. 4 is a highly schematic sectional view taken generally along line 4—4 of FIG. 3, and illustrates a blank-receiving hopper provided with means for stacking the blanks in exact alignment.

FIG. 5 is a perspective view of a honeycomb log and illustrates the configuration of the log prior to being expanded.

FIG. 6 is a fragmentary enlarged top view of the unexpanded honeycomb log of FIG. 5 and illustrates the alternating lines of adhesive between the individual blanks thereof.

FIG. 7 is a perspective view of the honeycomb log of FIGS. 5 and 6, illustrates the expanded configuration of the honeycomb log.

FIG. 8 is a fragmentary top view of the expanded honeycomb log, and more clearly illustrates the configuration of the various cells thereof.

A novel honeycomb structure forming apparatus constructed in accordance with this invention is fully illustrated in FIG. 1 of the drawings, and is generally designated by the reference numeral 10. The apparatus 10 includes a conventional supporting framework (not shown) which supports a roll 11 of sheet material, such as paper, plastic, cloth, metal or similar flexible material. A web 12 is drawn from the roll 11 by conventional feed means (not shown), and is fed along a predetermined left-to-right path, as viewed in FIG. 1 of the drawings, to a conventional press 13. The web 12 is fed between a lower bed (not shown), and an upper reciprocal press plate 14. The lower surface (unnumbered) of the press plate 14 includes a plurality of relatively sharp parallel scoring bars 15 through 18 which are disposed generally normally to the predetermined path of travel of the web 12. Generally triangularly shaped cutting elements 20 and spaced parallel cutting bars 21, 22 are also carried by the press plate 14. As the press plate 14 of the press 13 descends the cutting bars on blades 21, 22 sever the web 12 into individual blanks 23 through 25, etc. The cutting elements 20 form registering means or notches, each being designated by the reference numeral 27 in adjacent edges 28, 29 of each of the blanks 23 through 25. Five such notches 27 are illustrated in each of the blanks, but it is to be understood that more or less than the illustrated number of notches may be provided, and that the unnotched adjacent edges (unnumbered) of the blanks can be provided with one or more of such notches. The scoring bars 15 through 18 form respective weakening lines 30 through 33 in each of the blanks, as is best illustrated by the blank 23 of FIG. 1.

After each blank is cut from web 12, the press plate 14 of the press 13 is retracted upwardly, and the blank is removed from the press by conventional means (not shown) and deposited upon conveyor means generally designated by the reference numeral 35. The conveyor means 35 includes a driven roll 36, and an idler roll 37 suitably conventionally journalled in the framework (not shown) of the apparatus 10. The conveyor means or conveyor 35 also includes two relatively wide conveyor tapes 38, 40 entrained about the rolls 36, 37 and a plurality of supporting elements or strands 41 through 44 which are similarly entrained about the rolls 36, 37. Each of the strands 41 through 44 is received in annular grooves (unnumbered) in the rolls 36, 37, as is best illustrated with respect to the roll 36 in FIG. 3 of the drawings. The grooves maintain the strands 41 through 44 in equally spaced relationship along lines generally parallel to the predetermined path of travel of the web 12 and the blanks 23 through 25, etc.

The conveyor 35 is continuously driven and advances the blanks 23, 24 etc., through an adhesive applying mechanism or means, generally designated by the reference numeral 45. The adhesive applying means includes a manifold or chamber 46 (FIGS. 3 and 4), supported by the framework (not shown) of the apparatus 10 above the upper runs (unnumbered) of the strands 41 through 44 and the tapes 38, 40. The manifold 46 includes a plurality of identical nozzles 47 having individual valves (FIG. 4) for controlling the rate of flow of the adhesive A onto each of the blanks. The manifold 46 is connected to an adhesive reservoir 50 (FIG. 1) by means of an elbow 51 (FIG. 1) a valve 52 (FIGS. 3 and 4) a flexible conduit 53, a pump 54 (FIG. 1) and a conduit 55. The pump 54 operates continuously during the operation of the apparatus 50 to pump the adhesive A from the reservoir 50 to and through the manifold 46 and the nozzles 47.

The adhesive applying means 45 also includes a trough 56 positioned beneath the conveyor mechanism 35 and in vertical alignment with the manifold 46, as is best illustrated in FIG. 4 of the drawings. The trough 56 is inclined to the horizontal and directs the adhesive A to a collection vessel 57 (FIGS. 1 and 3). The collection vessel 57 is preferably placed in fluid communication with the reservoir 50 by means of a pump and conduits, corresponding to the pump 54 and the conduits 53, 55 to achieve continuous recirculation of the adhesive A.

The manifold 46 is reciprocally mounted for movement transverse to the direction of the path of travel, and the reciprocating movement thereof is controlled by control means, generally designated by the reference numeral 60. The control means 60 is a conventional solenoid having a core 61 connected to the manifold 46. The solenoid core 61 is spring biased or otherwise normally positioned in a retracted position and upon being energized the core 61 is moved to the left as viewed in FIG. 3 to similarly shift the manifold 46 in this same direction for a reason which will be more apparent hereafter.

The solenoid 60 is actuated in synchronism with the operation of the press 13 by means of conductors 62, 63, 64 and a conventional switch 65 which may include a conventional time delay mechanism to regulate the shifting of the manifold 46 transversely of the conveyor 35 during the time that the gap or space between leading and trailing blanks underlies the manifold 46, as graphically illustrated in FIG. 1 of the drawings by the respective blanks 24, 23.

Assuming the blank 24 is approaching the manifold 46 and that the solenoid 60 is energized, i.e., the core 61 is projected to the left as viewed in FIG. 3 of the drawings, adhesive is applied to an upper surface of the blank 24 along spaced parallel lines 66 which are substantially normal to the weakening lines 30 through 33. At this time the adhesive flows from the nozzle 47 in vertical planes V (FIG. 3). After the trailing edge of the blank 24 has passed beyond the nozzles 47 the manifold 46 is shifted to the right as viewed in FIG. 3 of the drawings by the control mechanism 60 prior to the time the leading edge of the trailing blank 23 arrives beneath the nozzles 47. With the manifold 46 shifted fully to the right as viewed in FIG. 3 of the drawing the adhesive flows from the nozzles in vertical planes V1 (FIG. 3) which are transversely offset from the vertical planes V. Lines of adhesive (not shown) are therefore applied to the blank 23 in spaced parallel relationship but the lines applied to the blank 23 are transversely offset or staggered relative to the lines of adhesive 66 applied to the blank 24. After the trailing edge of the blank 23 has passed the nozzles 47 but before the leading edge of the following blank approaches the nozzles the control means 60 is again actuated to shift the manifold to the solid outline position illustrated in FIG. 3 to again deposit the adhesive A along the vertical planes V. In this manner lines of adhesive are applied to each of the blanks in transversely staggered relationship which effects an open ended cellular structure in the honeycomb, as will be more apparent hereafter.

It should be particularly noted that during the time blanks are absent beneath the nozzles 47 the adhesive flowing therefrom along either of the planes V, V1 is not deposited upon the strands 41 through 44. Vertical planes taken through the strands 41 through 44 are transversely offset from the planes V, V1 and the conveyor 35 is thereby maintained relatively free of adhesive which would otherwise be accidentally applied to the blanks and result in irregular cell structures. Furthermore, due to the extremely thin cross-section of the strands 41 through 44 any adhesive deposited thereon would not be appreciable due to the limited line contact between the strands and the undersurfaces of each of the blanks, and regular cell structure configurations would still result in the final honeycomb structure.

After each of the blanks has been coated with the adhesive A along the lines 66, the blanks are delivered to a box or hopper 70 which functions as means for assembling the individual blanks in stacked relationship to form a stack 69 of superimposed blanks. The hopper 70 includes four vertical walls 71 through 74 (FIG. 2) and a bottom wall 75 (FIG. 4) which defines a generally rectangular volume of a peripheral configuration corresponding to the general outline of each of the blanks 23, 24, etc. The walls 71, 72 are each provided with identical guide means 76 having a generally triangular cross-sectional configuration and upwardly tapering upper end portions 77. Each of the guide means 76 is designed to register with an associated one of the notches 27 of the blanks and the blanks are deposited in the hopper 70 by the conveyor 35, the guide means 76 thereby serving to accurately guide the blanks into stacked relationship in the manner readily apparent from FIGS. 1, 2 and 4 of the drawings.

The hopper 70 is also preferably provided with a conventional vibrator 80 (FIG. 4) in the event any one of the blanks is introduced into the hopper 70 with the notches thereof misaligned with the guide means 76. The horizontal reciprocal vibration of the hopper 70 by means of the vibrator 80 effectively shifts any such misaligned blanks to register the notches thereof with the guide means 76 and achieve the uniform stacked relationship heretofore noted.

It should also be noted that the stack 69 of the blanks are not only aligned edgewise by the cooperative guiding between the notches 27 and the guide means 76, but that the weakening lines 30 through 33 of superimposed and subimposed blanks are all perfectly aligned and lie in a common vertical plane.

After a predetermined number of the blanks have been deposited in the hopper 70 the stack 69 is removed and placed between platens (unnumbered) of a conventional press 79. The press 79 is not at all times necessary to urge the plurality of blanks into intimate adhesive contact, but more uniform bonds between the plurality of blanks is generally effected by subjecting each stack 69 to similar pressure between the platens of the press 79.

The stack of blanks 69 is generally referred to as a "honeycomb block" and is conventionally cut into lengths of desired widths to form "honeycomb logs." However, in accordance with this invention, it is unnecessary to "cut" or otherwise sever the honeycomb block 69 due to the presence of the aligned weakening lines 30 through 33. In accordance with this invention the honeycomb block 69 is removed from the press and transferred to a reciprocal hammer mechanism, generally referred to by the reference numeral 85. The honeycomb blocks 69 are merely supported by a conventional support and the hammer mechanism 85 is rapidly descended against successive portions of the block along the respective weakening lines 33, 32, 31, 30, in the manner diagrammatically illustrated in FIG. 1 of the drawings to form honeycomb logs 86, 87 etc. It should be noted that the honeycomb log 86 is narrower than the honeycomb log 87. In the preferred operation of the apparatus 10 each of the logs is preferably of a uniform width, but the invention has been described in a manner which highlights the versatility of the apparatus 10 to form honeycomb logs of varying widths by merely varying the position of the weakening lines 30 through 33.

Further, while the weakening lines are formed in parallel relationship in each blank to form generally rectangularly shaped honeycomb logs, it is to be understood that the weakening lines can be angularly disposed relative to each other, can be curved or otherwise contoured to form honeycomb logs of different configurations depending upon the particular functions for which the logs are designed.

The honeycomb log 87 is illustrated in FIG. 5 of the drawings prior to being expanded to form a honeycomb structure generally designated by the reference numeral 90. The honeycomb log 87 is merely expanded from the unexpanded configuration of FIGS. 5 and 6 by conventional means to the expanded configuration of FIGS. 7 and 8 to form the usual open-ended cells 91 which are four-sided due to the particular manner in which the lines of adhesive are applied to the individual blanks. However, it is to be understood that hexagonal, octagonal, etc. cells can be formed in accordance with this invention, merely by altering the application of the adhesive by the adhesive applying means 45 to the individual blanks.

From the foregoing, it will be seen that novel and advantageous provisions have been made for carrying out the desired end. However, attention is again directed to the fact that additional variations may be made in this invention without departing from the spirit and scope thereof as defined in the appended claims.

We claim:

1. Apparatus for forming honeycomb structures comprising means for conveying a plurality of sheet material blanks along a predetermined path in spaced relationship to each other, means adjacent said predetermined path for applying adhesive to said blanks, means mounting said adhesive applying means for movement transversely of said path, control means for moving said adhesive applying means transversely during the time leading and trailing ones of the blanks are respectively downstream and upstream of said adhesive applying means, and means for assembling said blanks in stacked relationship.

2. The apparatus as defined in claim 1 including means for forming registration means in the blanks prior to assembling thereof into stacked relationship, and guide means cooperative with the registration means for guiding individual ones of the blanks into stacked relationship.

3. The apparatus as defined in claim 1 including means for forming spaced weakening lines in the sheet material in generally parallel relationship.

4. The apparatus as defined in claim 2 wherein said guide means is at least a single generally vertically positioned guide member of a predetermined exterior surface configuration, and said registration forming means forms registration means in the form of at least a single notch in each blank having a portion complementary contoured to the configuration of said guide member.

5. The apparatus as defined in claim 1 wherein said conveying means includes a plurality of conveying elements in spaced relationship beneath said adhesive applying means, said adhesive applying means being operative to apply the adhesive in spaced parallel lines, and said control means being operative to prevent any one line of adhesive from contacting any conveying elements during the time leading and trailing ones of the blanks are respectively downstream and upstream of said adhesive applying means.

6. The apparatus as defined in claim 1 wherein said control means is operative for reciprocating said adhesive applying means in alternating directions as successive ones of the blanks pass downstream of said adhesive applying means.

7. The apparatus as defined in claim 1 wherein said adhesive applying means includes a plurality of nozzles for directing lines of adhesive toward said path, and means beneath said path for accepting adhesive which is not applied to the blanks.

References Cited

UNITED STATES PATENTS

| | | | |
|---|---|---|---|
| 2,610,934 | 9/1952 | Steele | 156—197 |
| 2,983,640 | 5/1961 | Knoll et al. | 156—197 |
| 3,242,024 | 3/1966 | Bova et al. | 156—197 |
| 3,301,729 | 1/1967 | Kauffman | 156—197 XR |

JOHN T. GOOLKASIAN, Primary Examiner

H. F. EPSTEIN, Assistant Examiner

U.S. Cl. X.R.

118—323; 156—512, 558, 563